April 15, 1941.    R. L. HASCHE    2,238,490
TREATMENT OF GAS MIXTURES CONTAINING ACETYLENE
Filed July 21, 1937    3 Sheets-Sheet 1

Rudolph Leonard Hasche
INVENTOR

BY
ATTORNEYS

5- ABSORBER COLUMN
9- STRAW OIL REGENERATION
82- $CO_2$ REMOVAL
21- ABSORBER COLUMN
23-27- $C_2H_2$ RECOVERY FROM SOLVENT
57-59- OLEFINE RECOVERY
71-72- REFRIGERATION GENERATOR
44- REFRIGERATED CONDENSER
48- R-HCO REMOVAL

Rudolph Leonard Hasche
INVENTOR

April 15, 1941.  R. L. HASCHE  2,238,490
TREATMENT OF GAS MIXTURES CONTAINING ACETYLENE
Filed July 21, 1937  3 Sheets-Sheet 3

Rudolph Leonard Hasche
INVENTOR

Patented Apr. 15, 1941

2,238,490

UNITED STATES PATENT OFFICE 2,238,490

TREATMENT OF GAS MIXTURES CONTAINING ACETYLENE

Rudolph Leonard Hasche, Kingsport, Tenn., assignor to Eastman Kodak Company, Rochester, N. Y., a corporation of New Jersey Application July 21, 1937, Serial No. 154,850

6 Claims. (Cl. 183—115)

This invention relates to the treatment or processing of acetylene-containing materials, and more particularly to the physical treatment and chemical conversion of such materials.

While acetylene and acetylene-containing materials have been known for a considerable period, such acetylene products have been largely obtained from calcium carbide, an expensive source of acetylene, and as will be pointed out, such acetylene possessed different quality than the materials with which the present invention is primarily concerned. At the present time, there are various processes for the production of acetylene-containing materials (other than from calcium carbide), and in particular, processes comprising the pyrolysis of hydrocarbons, that yield materials comprised only in part of acetylene.

This source of acetylene is relatively economical and is the source with which my invention is primarily concerned. However, the use of such materials comprised only in part of acetylene and which I also will refer to as "diluted acetylene," has presented a number of difficulties when attempts have been made to employ such materials in various chemical reactions or for other purposes.

I have found a method of processing and using these economically produced acetylene-containing materials, by which satisfactory and efficient results may be obtained. I have found that such acetylene-containing materials, when properly treated, may be handled, processed, and chemically converted in a number of different ways.

This invention has for one object to provide a process for treatment and processing of materials comprised only in part of acetylene, such as obtained from hydrocarbons. Another object is to provide a process for purifying materials containing acetylene. Still another object is to provide a process for treating materials comprised only in part of acetylene for increasing the effective acetylene content. Still another object is to provide a process for improving acetylene-containing materials involving both chemical and physical treatment.

Another object is to provide a process for treating materials comprised only in part of acetylene to form reaction products of acetylene therefrom. Still another object is to provide a process of preparing acetylene reaction products in which there is no substantial loss of acetylene. Another object is to provide an economical and efficient method of converting acetylene materials from hydrocarbons to acetaldehyde and other chemical compounds. Still another object is to provide a method of concentrating and separating acetylene from materials comprised only in part of acetylene. Still another object is to provide a process which includes recycling. A still further object is to provide a process for the treatment of gaseous mixtures comprised only in part of acetylene in which refrigeration may be generated.

Another object of my invention is to provide a process of treating materials comprised only in part of acetylene, such as obtained from the pyrolysis of hydrocarbons, to obtain a maximum yield of acetaldehyde per unit of catalyst converted during hydration. Still another object is to provide a process of chemically converting acetylene-containing materials to other compounds in which the size of equipment required may be reduced. Another object is to provide a process of producing acetaldehyde in which acetaldehyde may be cooled by refrigeration generated in the system. A still further object is to provide a process of treating acetylene-containing materials to render them more suitable for use in catalytic processes or other employment.

The particular method of obtaining the acetylene-containing materials to be employed in my process forms no part of the present invention. Numerous methods of producing gaseous mixtures comprised only in part of acetylene are known. For example, some of such methods are by pyrolysis of hydrocarbons, by treatment of hydrocarbons in electrical arc, or by incomplete combustion. There are also methods of producing such acetylene-containing materials by chemical synthesis. Ellis, in his book entitled "The Chemistry of Petroleum Derivatives," pages 147 et sequi, describes a number of methods of producing acetylene-containing materials.

It is desired to point out, however, that preferably the acetylene-containing materials should also include an olefine content or some other hydrocarbon such as, for example, the content of methane. The content of this material such as ethylene or methane or the combined content preferably should be about equal to or greater than the content of acetylene for reasons to be set forth hereinafter. That is, a preferred gaseous mixture to be employed in my process would comprise acetylene together with a substantial olefine content such as several per cent of ethylene. If the gas to be treated does not contain such an olefine content, it will be apparent as a description of my process proceeds, that I have provided a method wherein such an olefine content may be obtained. That is, the olefine content, if not produced by the conversion of hydrocarbons to acetylene, may be added either prior or subsequent so that the resultant acetylene will be in the presence of such material. As will be pointed out, the presence of an olefine or to some extent a hydrocarbon such as methane, is particularly beneficial in my process.

I have also found that these various sources of acetylene-containing materials obtained from hydrocarbons, also contain various other constituents which are detrimental to the subsequent processing or reaction of the acetylene contained therein. For a more complete understanding of my invention, reference will be made to the following drawings which form a part of the present application.

Figure 1:
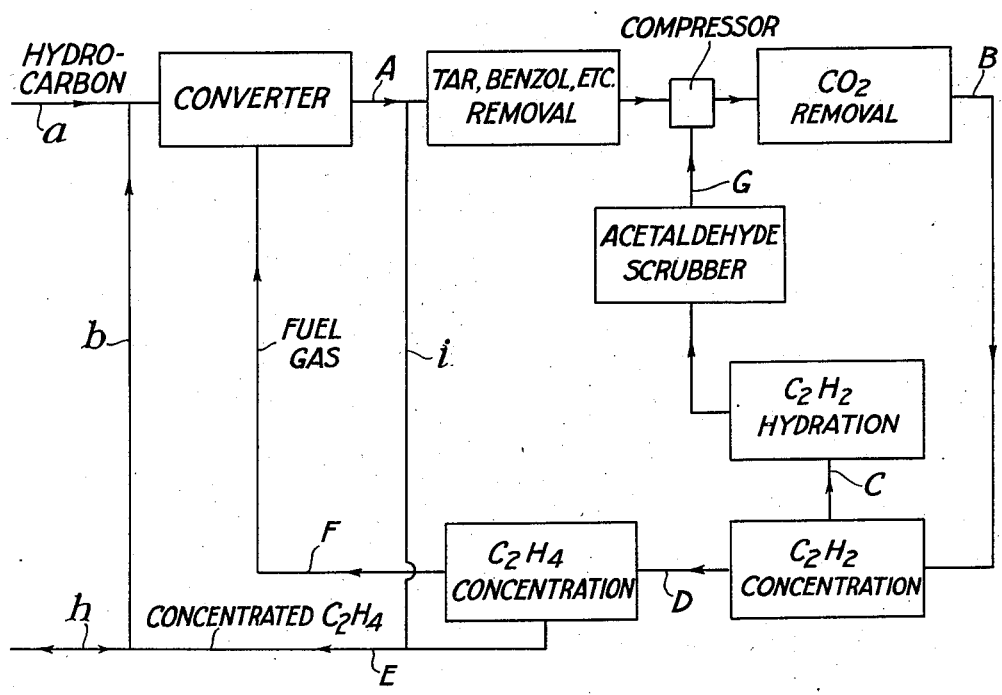
Fig. 1 is a side elevation view in the nature of a flow sheet showing the general nature of apparatus set-up for carrying out my process.

Reference is now made to Fig. 1 for describing generally my process and its preferred manner of operation. Suitable hydrocarbon material, such as the saturated hydrocarbons ethane, propane and butane, as at $a$, may have mixed therewith a content of olefine, such as ethylene, as well as a content of some other hydrocarbon such as methane supplied through $b$. The mixture would be processed in the unit designated "converter." This unit might be a furnace, apparatus for incomplete combustion, or any of the other various apparatuses known to produce acetylene-containing materials. As already set forth, the exact manner of producing the acetylene, olefine or other hydrocarbon-containing mixture forms no part of the present invention. It is merely pointed out with reference to the present invention that a mixture of acetylene with preferably a constituent such as ethylene and methane is obtained. This mixture might be obtained directly from some process or if the acetylene materials do not contain the desired other hydrocarbon component, as diagrammatically indicated in Fig. 1, this component may be supplied through $h$ and conducted through $b$ or $i$ to the system. In any event, a gas mixture containing a substantial amount of acetylene, say for example, between about 4 and 25% is obtained at A. This mixture would also preferably contain a comparable amount of ethylene or methane, the balance thereof would comprise, for example, hydrogen, carbon monoxide, nitrogen, carbon dioxide, benzol, naphthalene, anthracene and the like. These latter components which I have found present in the various economical sources of acetylene from hydrocarbons under description in the present application, are to a large extent detrimental impurities more or less invariably present and therefore in a different category than the olefine and methane contents. This gas mixture at A is fed through the unit designated "benzol removal." As the terminology suggests, this unit may comprise an oil scrubber. Various benzol removing systems are described in the book entitled "Benzol" by Whitehead, 1920. In this unit by proper treatment which will be described in further detail hereinafter, the heavy impurities such as benzene, anthracene, tars and the like are removed by scrubbing. This benzol scrubbing system has been introduced in the suction side of the compressor shown in Fig. 1. Therefore, the gases leaving the benzol scrubber pass into a compressor where pressure thereon may be materially raised.

It is known that there are hazards in handling acetylene under pressure due to its explosive nature. In some instances, however, pressure has been applied to acetylene-containing mixtures. I have found, however, that if acetylene is in the presence of certain other constituents such as olefines, methane or the like, it is possible to compress the acetylene-containing materials to pressures greater than heretofore employed. The capability of employing such higher pressures is of considerable advantage, as will be apparent, inasmuch as the employment of pressure facilitates separation, chemical conversion or various other processes.

The compressed acetylene-containing materials leave the compressor and pass to the unit on Fig. 1 designated carbon dioxide removal. This unit may comprise any of a number of various carbon dioxide removal units. Preferably, a scrubbing unit involving the use of a solvent which forms a loose chemical combination with the carbon dioxide, is preferred. A number of methods of removing carbon dioxide are referred to in the aforementioned Ellis publication. I have found that various amine solutions are satisfactory for removing carbon dioxide from my gas mixture. Among these solutions may be mentioned ethanolamines, diaminoisopropanol and various others. It is also possible to employ either a potassium or sodium carbonate aqueous solution.

I have found that the presence of carbon dioxide in acetylene-containing mixtures of the type under consideration has been a factor presenting difficulties in the utilization of the acetylene. The carbon dioxide is susceptible to being absorbed by solvents for the acetylene. Also, in any process involving recirculation, the carbon dioxide tends to build up to an undesirable concentration. By means of my process I am able to eliminate these various difficulties.

Therefore, the acetylene-containing gas in my process at B is substantially or entirely carbon dioxide-free and under compression. From B the gas mixture may be passed to acetylene concentration. As will be pointed out in more detail the gas withdrawn at C is suitable for conversion to various chemical products such as acetaldehyde. Any unreacted acetylene at G may in my process be recirculated without detriment, inasmuch as it does not contain impurities as carbon dioxide or the like which would build up in the system. The gas at D may pass to an ethylene (olefine) concentrator by means of which an olefine addition may be obtained for use in the aforementioned olefine addition. At least a part of this olefine, or other hydrocarbon content such as methane, is returned. In the event that too large a quantity is present, a portion thereof may be withdrawn as at $h$. Or, as previously indicated, olefine or other hydrocarbon may be introduced into the process at this point.

From the preceding general description of my process, it may be seen that the acetylene is treated in various ways. That is, the acetylene-containing materials are improved chemically and may be subsequently concentrated. Or, it is possible, in accordance with other modifications of my process, to chemically react the improved acetylene under pressure or without pressure. While in the previous example I have referred to conversion of acetylene into acetaldehyde, it is understood that this is primarily for illustrating the general application of my invention inasmuch as conversion of acetylene to acetaldehyde provides a particularly desirable use for acetylene.

Figure 2:
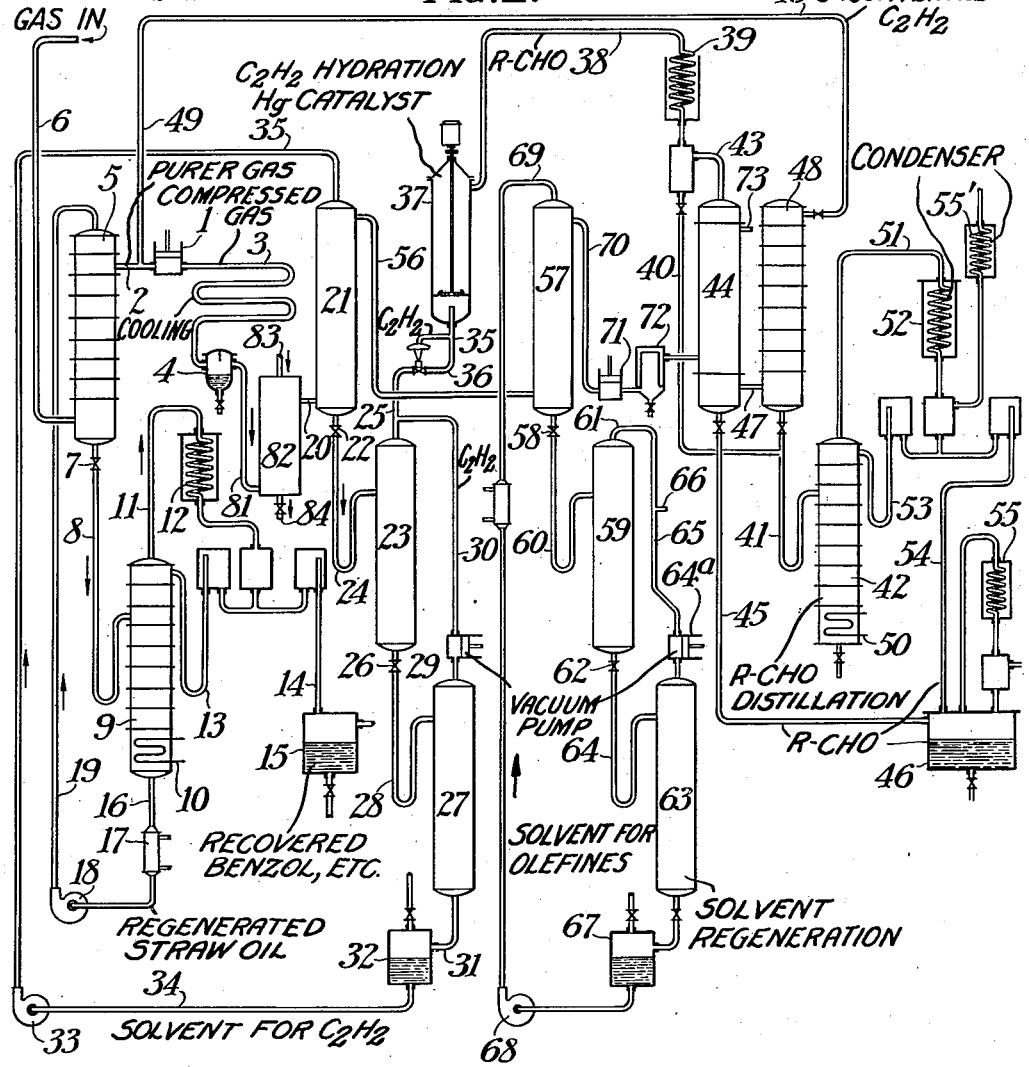
Fig. 2 is a diagrammatic side elevation view also in the nature of a flow sheet showing in more detail an arrangement of units for carrying out my process.

For a still further understanding of my invention, reference is now made to Fig. 2 with respect to which I described a preferred method of operation involving the entire group of steps in my process.

A two-stage, selective absorption method is made possible due to the difference in solubility of the acetylene and ethylene. In practically all of the common solvents the acetylene is from 5 to 10 times as soluble as ethylene. Fortunately, about the greatest difference in solubility occurs with water as the solvent. For instance, at 25° C., 0.11 gram of acetylene and 0.0131 gram of ethylene are taken up by 100 grams of water if the absorption is carried out with pure gas at 1 atmosphere pressure. In other words, acetylene is 8.4 times more soluble than ethylene under the conditions just mentioned. However, the solubility of gas is proportional to its partial pressure. Hence, the relative amounts of acetylene and ethylene dissolved not only depend on the solubility coefficients but also on the partial pressure in the gas.

In my two-stage absorption process I may use water in the first stage to concentrate the acetylene and separate it reasonably free from ethylene, while in the second stage of the absorption I may use a cheap hydrocarbon oil such as the kerosene fraction from petroleum to separate the ethylene practically completely from the gas. Furthermore, I prefer to carry out the absorption under pressure, because it is more economical since the size of the equipment as well as the amount of the absorbent circulated will be reduced almost in direct proportion to the pressure applied.

As already pointed out, it is common knowledge that there are hazards in handling pure acetylene under pressure due to its explosive character. However, I have found that if acetylene is present in a gas mixture containing other hydrocarbons such as olefines, it can be compressed to a relatively high degree without danger of explosion. For instance, a 10–15% acetylene can be compressed to 30 atmospheres without danger. The degree of pressure generally may vary from 10 to 30 atmospheres in carrying out my process and may reach 60 atmospheres pressure. The actual pressure to be selected depends on many factors. However, it may be said in general that the power for compressing the gas is a logarithmic function of the number of compressions, while the solubility in a solvent is approximately a linear function of the pressure. Higher pressures are then more economical from a power standpoint. As an example, the operation of my process will be explained by considering a gas of the following composition after a steady state has been established by recirculating the ethylene and perhaps part of the methane and adding it to the incoming feed for cracking as described under Fig. 1.

Table I

|  | By volume |
|---|---|
| $CO_2$ | 0.6 |
| $C_2H_2$ | 14.7 |
| $C_2H_4$ | 20.3 |
| $C_6H_6$ | 0.4 |
| $O_2$ | 0.2 |
| $H_2$ | 37.8 |
| $CO$ | 2.4 |
| $CH_4$ | 23.1 |
| $N_2$ | 0.5 |

The gas passes through an absorption column using a hydrocarbon oil, for instance straw oil, to remove the benzene and other high molecular weight compounds such as naphthalene and anthracene which are present in the gas. Only a relatively small amount of the absorbing oil is required to completely remove these constituents. In fact the quantity required is so small that very little acetylene and ethylene is absorbed. The constituents absorbed in this first oil scrubber are of value and may be recovered from the absorbing oil by rectification. The gas leaving the benzene scrubber would have approximately the same composition as that given above except that it would be free of the benzene, etc. I have discovered that not only is it desirable to remove the benzene and recover it because of its commercial value, but that it is quite necessary to remove it from the gas containing acetylene which it is desired to hydrate or otherwise chemically treat. The presence of small amounts of benzene interferes with the hydration of acetylene because it aids the polymerization of acetaldehyde, causes foaming in the catalyst and lowers the yield of acetaldehyde based on mercurous sulfate reduced.

The gas mixture from the aforementioned scrubbing action, now freed of benzol and other similar impurities, is conducted to the compressor where the gas is compressed to pressure of from 10–30 atmospheres, preferably the latter pressure and is cooled to approximately atmospheric temperature. The compressed gas then passes through one or more scrubbing units through which circulate liquid for removing carbon dioxide. This step in my process is particularly important and I preferably employ a liquid which forms a loose chemical combination with carbon dioxide in order to obtain its complete removal. As already indicated, various basic materials such as aqueous solutions of alcoholic amines may be employed or various carbonate solutions. The contact of the solutions with compressed gas may be carried out in any conventional equipment such as scrubbing towers and the circulation may be either countercurrent or concurrent. In some instances such as, for example, when using a carbonate solution, some acetylene may be washed out along with the carbon dioxide. In this event, the mixture of carbon dioxide and acetylene evolved by heating and/or reducing the pressure on the scrubbing solution, may be passed through another carbon dioxide scrubbing operation to separate it into two fractions, one containing substantially pure carbon dioxide and the other containing substantially pure acetylene.

The compressed gas still under substantially the initial pressure passes from the carbon dioxide scrubber into a second absorbing system in which water is used as the absorbent. The amount of water used in the absorption is very important. Only that amount is used which will completely absorb the acetylene. Under such conditions only a small amount of the ethylene will be absorbed. I have found in absorption under pressure of the range I have indicated that the amount of water required is approximately 70# per cubic foot of gas treated, at the pressure of the absorption and at a temperature of about 25° C. Under such conditions with the gas of the composition given above a concentrated gas can be obtained from the water absorption step which will contain about 73% of acetylene and 12% of ethylene, the balance being mainly hydrogen and methane.

In other words, I have selectively absorbed and recovered acetylene almost completely along with only about 12% of the ethylene which was contained in the original gas. The compressed gas after passing through the water absorbing system will analyze about 22% ethylene, 46% hydrogen, 29% methane, and the balance non-hydrocarbon constituents. Furthermore, by the process just described from one volume of the cracked gas, I have obtained .2 of a volume of concentrated gas containing about 73% of acetylene which is of an ideal strength and purity for hydration to acetaldehyde.

The compressed gas from the water absorption system then passes to another absorber where hydrocarbon oil is used as an absorbent. I use kerosene because of its cheapness and high absorptive capacity for ethylene and relatively low vapor pressure. However, other organic liquids may be used such as acetone or an alcohol at either atmospheric temperatures or at reduced temperatures. In using kerosene a compressed gas containing 22% of ethylene is subjected to absorption and a concentrate gas obtained containing 50–55% ethylene and the balance methane, ethane and hydrogen. This concentrated gas is then recycled either separately or mixed with the incoming hydrocarbon raw material. The amount of kerosene which I have found to be suitable is about 25 to 35 pounds per cubic foot of gas at the pressure of the absorption and at a temperature of about 25° C.

The stripped gas leaving the kerosene absorber will contain 60 to 75% of hydrogen and about 20 to 30% of methane and a small amount of carbon monoxide. This gas can be used for heating the converter.

As I have stated, some of the major purposes of my invention are to separate the ethylene from the acetylene and return the former to the forming operation; and to obtain a concentrated acetylene gas free from impurities which interfere with hydration to acetaldehyde and to recirculate the off gas from the acetylene hydrator back to the compressor so as to avoid any loss of acetylene.

Thus in practicing my invention it is to be noted that several types of recirculation are resorted to; the ethylene is recirculated and the acetylene leaving the hydrator is returned to the compressor for reconcentration so that no acetylene is lost to the system. The concentrated gas from the water absorption system containing about 73% acetylene and 12% ethylene, after passing through the hydration catalyst may contain about 23% acetylene which corresponds to about 90% conversion, and its volume has shrunk to about ⅓ of the original or about 7% of the cracked gas entering the compressor.

The operation of my invention will be further described by reference to Fig. 2. The gas enters an absorption column 5 through pipe 6 and passes up in counter-current flow to the absorption oil which is a light oil, preferably that sold in the trade as straw oil. The amount of oil used is only that required to completely absorb benzene together with the compounds such as naphthalene, anthracene, of higher molecular weight. Absorbing column 5 is preferably a bubble cap column. The straw oil saturated with benzene and other absorbable constituents flows out of the bottom of the column where any pressure may be relieved by valve 7 and flows through pipe 8 into rectification column 9. This column is provided with a base heater 10 which serves to distill from the absorbing oil the benzene faction which passes out through pipe 11 and the vapors are condensed by condenser 12. In place of this arrangement, live steam may be employed for removing the benzene. Reflux back to the column occurs through pipe 13 and the recovered benzol fraction passes out through pipe 14 and collects in storage tank 15. Hot straw oil from which the absorbed constituents have been expelled leaves column 9 through pipe 16 and passes through cooler 17 and is then pumped up to the desired absorbing pressure by pump 18 and returned to the column through pipe 19.

The treated acetylene and ethylene now free of heavy impurities enters compressor 1 through pipe 2, where it is compressed to a pressure of from about 10–30 atmospheres. The heat of compression is removed by water-cooling coil 3 and thence the gas passes through separator 4 for the removal of condensed oil and water mist.

From separator 4 the compressed gas passes through conduit 81 to the scrubbing tower 82, wherein carbon dioxide removal takes place. This is accomplished by feeding a solvent for the carbon dioxide into the unit at 83 and withdrawing the charged liquid as at 84. If desired, this solvent may be circulated through a regeneration system in a manner as described with respect to the benzol removal system. While a single column has been shown for conducting this step, it is, of course, understood that several such units may be employed if desired. I have found that the feature of being able to apply substantial compression to the acetylene-containing materials greatly facilitates the carbon dioxide removal. Heretofore, there has been considerable reluctance toward employing pressure when treating acetylene. However, in my process the presence of ethylene, methane or other similar hydrocarbon permits the compression of the acetylene mixture to relatively high values. The presence of these other gases eliminates danger of explosion. Placing the gas mixture under considerable compression as I have shown, makes possible the removal of carbon dioxide therefrom efficiently and completely.

The gas after passing through the carbon dioxide absorption leaves through pipe 20 and enters the second absorption column 21. This column is preferably a packed column because of the large ratio of absorbing liquid to gas flow. Absorbing medium in column 21 is water and only that amount is used which will completely absorb the acetylene, and under these conditions only a small percentage of the ethylene and other constituents will be removed. Water containing absorbed acetylene and a small amount of other constituents of the gas flows out of the bottom of the column and is expanded to atmospheric pressure through valve 22. It then enters flash column 23 through pipe 24 and due to drop in the pressure to atmospheric the major portion of the acetylene is released and passes out through the top of the column through pipe 25. It will be clear that the absorbed gases in column 23 may be released merely due to the drop in the pressure and no heat need be applied. The absorbent water then passes out of the bottom of column 23 and the pressure is still further released through valve 26. The liquid enters the stripping column 27 through pipe 28. A vacuum of about .9 of an atmosphere is maintained on column 27 by vacuum pump 29. Further quantities of absorbed constituents are removed from the water and pass through pipe 30 where they meet acetylene-containing gases released from flash column 23. Water which is freed from substantially all of its absorbed constituents passes out of column 27 through pipe 31 and enters storage tank 32. It then enters pump 33 through pipe 34 and it is again returned to the top of column 21 through pipe 35. An optional method of operating my process is to use fresh water for the absorption and use water from the storage tank 32 for quenching the gases from the convertor (Fig. I). In this manner, no acetylene would be lost to the system. The concentrated gases obtained from flash column 23 and stripping column 27 which may contain 50–75% acetylene pass through pipe 36 into reaction vessel 37 which contains a dilute sulfuric acid solution together with mercurous or mercuric sulfate catalyst, or other catalyst.

I have found that the gas of the strength obtainable with the type of absorption just described is of an ideal strength and purity for hydrating to acetaldehyde. This gas can be hydrated without encountering such difficulties as slime formation and foaming. I have also found that a high yield can be obtained based on mercury reduced in the catalyst solution. The gases containing acetaldehyde pass out of reaction vessel 37 through pipe 38 and are cooled in cooler 39 where some water is condensed containing absorbed acetaldehyde. This condensate flows through pipe 40 and joins pipe 41 which is connected to flash column 42. The gases containing the major portion of the acetaldehyde, after being cooled to substantially atmospheric temperature, pass through pipe 43 into condenser 44. Condenser 44 may be refrigerated by means of cold expanded gases after acetylene and ethylene content has been removed by the absorption steps. I shall later refer to the means provided for recovering this refrigeration. The condensed acetaldehyde leaves condenser 44 through pipe 45, and enters acetaldehyde storage tank 46. The gases after the larger portion of the acetaldehyde has been condensed, pass through pipe 47 into water scrubbing tower 48 which is preferably of a bubble cap type.

The gas leaving the top of the column through pipe 49 will still contain some acetylene because the conversion of acetylene in reactor 37 is not complete. The gas is returned to compressor 1 through pipe 2 and recirculated, thereby preventing loss of acetylene to the system. The amount of gas to be recirculated is a rather small percentage of the total incoming gas and amounts to not more than about 10%. This gas may now be used in the convertor or for other purposes. Water saturated with acetaldehyde passes out of the bottom of column 48 through pipe 41 into flash column 42. Acetaldehyde is flashed from the water by means of base heater 50 and passes out through pipe 51 and is condensed in refrigerated condenser 52. Reflux to the column returns through pipe 53 and recovered liquid acetaldehyde passes through pipe 54 into storage tank 46; vent condensers 55 and 55' prevent loss of acetaldehyde.

Returning now to the compressed gas leaving column 21 through pipe 56, now freed from its acetylene content but containing most of the ethylene together with other gas constituents, it enters absorption column 57 which is also preferably of the packed type and passes up through the column and meets the down-flowing stream of absorbing oil which may be a light gas oil or a kerosene fraction. The amount of oil used is just the amount sufficient to absorb substantially all of the ethylene. The absorbent oil containing dissolved constituents passes out of column 57 through valve 58 where its pressure is reduced to atmospheric.

Then it enters flash column 59 through pipe 60 and the major portion of the absorbed ethylene is released by merely reducing the pressure and passes out through pipe 61. The kerosene passes out of column 59 through valve 62 and enters column 63 through pipe 64. A vacuum of approximately .9 of an atmosphere is applied by vacuum pump 64-a and the gases expelled are pumped into the line 65 where they unite with the concentrated gas obtained from the top of column 59. This mixture of gas now contains a very high percentage of ethylene which passes out through pipe 66 and is returned to the converter for the purpose already set forth under Fig. 1. By choice of the quantity of solvent (such as kerosene) I am able to remove not only ethylene but ethylene and methane, increased quantities giving this result.

The kerosene leaving the bottom of column 63 passes to storage tank 67 thence is pumped by pump 68 back to the top of the pressure absorption column 57 through pipe 69. It will be clear from our description that the compressed gas passes in a series through several different absorption columns, the removal of benzol; the removal of carbon dioxide, then acetylene, and then ethylene, as major constituents. In passing through these columns the original pressure is maintained save for the small amount of pressure drop occurring in each absorbing column. The gas, after having passed through the final absorbing tower 57, leaves the top of the column through pipe 70 and enters an expanding cylinder 71 where the gas expands to substantially atmospheric pressure, thereby doing external work and cooling itself to a low temperature. Expander cylinder 71 may be a part of the same machine containing compressing cylinder 1 and the power generated in expansion of the gas utilized in the original compression of the gases.

The cold expanded gas leaving the cylinder passes through a bag filter arrangement 72 where solid consisting of water and kerosene is separated. It then enters condenser 44 and serves as a refrigerating medium for condensing out the acetaldehyde as before mentioned. It then passes out through pipe 73 and consists mainly of hydrogen with some methane and is utilized for the heating purposes.

Although in the above description of the operation of my process I have shown the use of water and the light petroleum oil, such as kerosene, as the two absorbents for selectively separating acetylene and ethylene from a dilute gas, other solvents may be used, without departing from the spirit of my invention. For instance in place of water any other absorbent may be used which has a considerably higher absorptive capacity for acetylene than for ethylene. For example, acetone may be used in place of water although it does not give as complete a separation of acetylene and ethylene. The solubility ratio of acetylene to ethylene in water and acetone is 8.4 and 6.5, respectively. Another reason for preferring water as an absorbent is that the loss of absorbent is negligible. In the case of acetone even if the absorbent is refrigerated and high pressure is used, there is still a considerable amount of acetone carried out by the absorbent and stripped gases, and it is necessary to use a scrubbing system to recover it.

Furthermore, it is possible to carry out my invention by using water absorbent in each step if the amount of water in the first step of the absorption is limited to just that quantity which will absorb the acetylene completely and using in the second stage a sufficiently large quantity to absorb the ethylene.

Another useful solvent for removing acetylene comprises the various aromatic esters of aliphatic alcohols such as, for example, dimethyl phthalate or the various other phthalates.

Also, in respect to recovering the absorbed acetylene or ethylene, other means than that described may be employed. For example, there may be the application of heat, or the combination of heat and vacuum.

Solubilities of the various constituents in dimethyl phthalate at 25° C. are as follows:

Table II

| | Vols. abs./vol. solvent |
|---|---|
| $C_2H_2$ | 6.5 |
| $C_2H_4$ | 1.34 |
| $CH_4$ | 0.26 |
| $H_2$ | 0.06 |

It will be noted that acetylene is seven times as soluble in dimethyl phthalate under the same conditions as in water, while its preferential solubility for acetylene as compared to ethylene is not as good as for water. It is practically equal to water for methane and hydrogen. Hence, it is possible to obtain a very good concentration by its use. Example of the results obtained from the cracked gas using dimethyl phthalate as solvent is as follows:

Table III

| | Percent cracked gas | Percent concentrated gas |
|---|---|---|
| $C_2H_2$ | 12.6 | 54.8 |
| $C_2H_4$ | 23.4 | 33.3 |
| $CH_4$ | 26.2 | 7.0 |
| $H_2$ | 31.1 | 1.6 |

In the above table in the first column are given the percentages of the important absorbable constituents in the cracked gas, and in the second column the percentages of the same constituents in the cooncentrated gas after absorption in dimethyl phthalate.

In the operation recorded above the temperature of the absorption is 40° C. and the amount of solvent used is 30% more than that theoretically required to absorb all of the acetylene. This excess of absorbent was used in order to remove substantially all of the acetylene from the cracked gas. Obviously, by use of a more efficient absorbing apparatus, the excess of the absorbent may be reduced and a somewhat higher acetylene concentration obtained.

The concentrated gas given in Table III, if subjected to another absorption under the same conditions, yields a concentrated gas analyzing as follows:

| | Per cent |
|---|---|
| $C_2H_2$ | 82.5 |
| $C_2H_4$ | 16.5 |
| $CH_4$ | 0.7 |
| $H_2$ | 0.3 |

If subjected to a third stage of absorption, the concentrated gas obtained is:

| | Per cent |
|---|---|
| Actylene | 94.0 |
| Ethylene | 6.0 |

In order to show the great advantage of dimethyl phthalate over other absorbents I may compare it with acetophenone which is probably the next best absorbent in the class of compounds having comparatively high boiling points. The specific absorption of acetophenone for acetylene and ethylene are 6.3 and 1.8, respectively, giving a ratio of 3.5 for $C_2H_2/C_2H_4$. This compares to a ratio of 4.85 as a corresponding value of $C_2H_2/C_2H_4$ for dimethyl phthalate. However, the vapor pressure of acetophenone at 25° C. is about 0.4 mm. as compared to approximately 0.02 mm. for dimethyl phthalate. While a vapor pressure of 0.4 mm. might appear low, when we consider the large volumes of gases passed through an absorbent to recover acetylene and the high molecular weight of the absorbent, the loss of acetophenone would preclude its use commercially, while the loss of dimethyl phthalate under the same conditions would be small.

Although I have given an example of the use of dimethyl phthalate, I do not wish to limit my invention to this specific compound. Other aromatic esters of phthalic acid are suitable. Dimethyl phthalate is preferred because it has the highest absorbing capacity of any compound of this class and has a lower viscosity.

While in the preceding example I have shown my process as including the conversion of acetylene to acetaldehyde as carried out under normal atmospheric conditions and in a certain preferred order of steps, it is to be understood that my invention is not to be restricted to this particular example. My invention has wider applications and may be subjected to considerable modification, as will be apparent from the description to follow of several other examples.

In the various examples which I have set forth herein, I describe the chemical reaction and the conversion of acetylene to acetaldehyde, inasmuch as my process is particularly adapted to this chemical reaction. In the production of acetaldehyde according to my novel processes, I describe the use of a mercury catalyst. This is the preferred type of catalyst employed in the industry, but it is of course possible to use other catalysts. When employing a mercury catalyst in the chemical conversion of acetylene to other products, the catalyst becomes reduced and must be regenerated or replaced. It is therefore apparent that the expense of such chemical processes are dependent to a considerable extent upon the catalyst reduced in relation to the yield of acetaldehyde.

Figure 5:
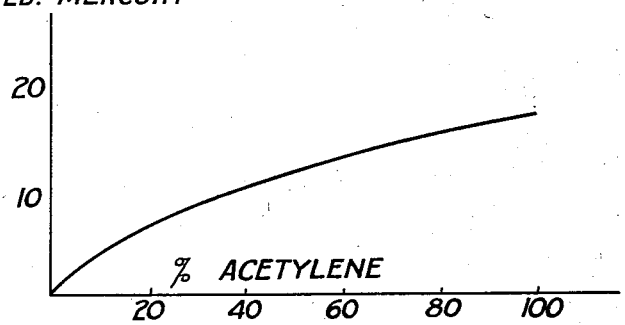
Fig. 5 is a curve showing the relationship between yield of acetaldehyde and partial pressure of acetylene.

I have found wherein my process of improving and compressing acetylene-containing materials may be adapted to the production of acetaldehyde in such a manner that efficient yields of acetaldehyde may be obtained per pound of catalyst reduced. Referring to Fig. 5, I have found that there is a definite relationship existing between the yield of acetylene converted to acetaldehyde per unit of mercury reduced. The curve in Fig. 5 graphically represents this relationship. Inasmuch as in my process of treating acetylene-containing materials I intentionally maintained the acetylene in the presence of ethylene, methane or other suitable hydrocarbon, I am able to increase the partial pressure of the acetylene as will be described in detail with respect to the following examples.

Figure 3:
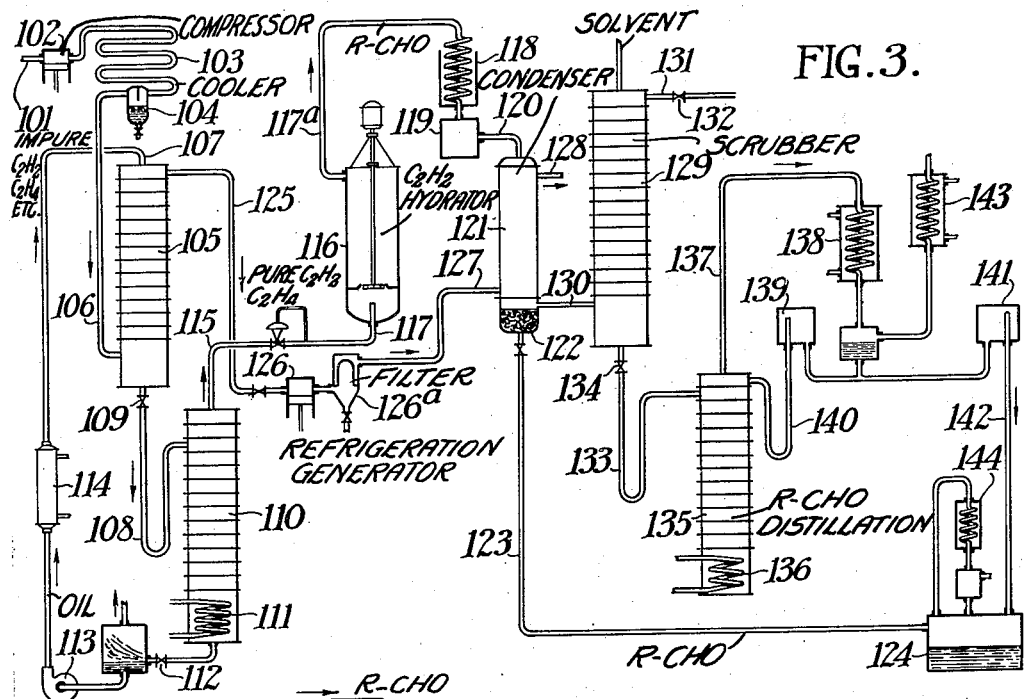
Fig. 3 is a side elevation view of another apparatus arrangement which may be employed for carrying out a species of my process.
Figure 4:
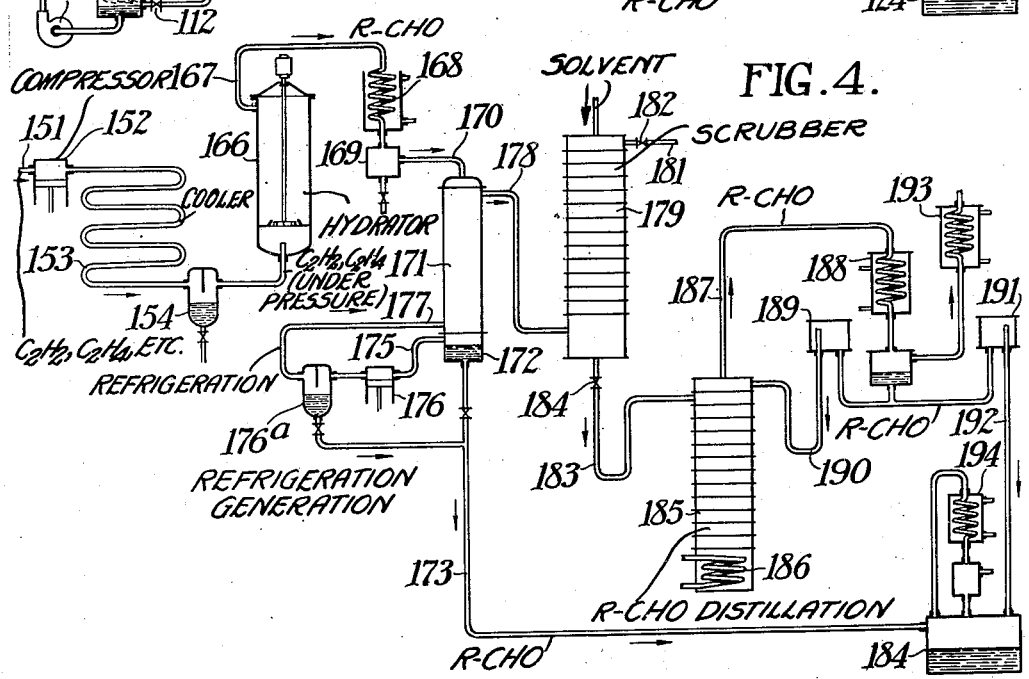
Fig. 4 is a side elevation view of another apparatus arrangement which may be employed for carrying out a species of my process.

In considering the following examples, it is pointed out that since the steps of oil scrubbing, carbon dioxide removal, etc. have been described in some detail in connection with Figs. 1 and 2, it will be assumed that these steps have been applied when considering the examples set forth in connection with Figs. 3 and 4.

My work has shown that the yield of acetaldehyde based on mercury reduced is directly proportional to the partial pressure of acetylene. Hence, if one wishes to operate with efficiency on a dilute gas, it is necessary to compress the former to such a pressure that the partial pressure of acetylene is approximately 1 atmosphere. The present practice of converting acetylene to acetaldehyde is to use a considerable excess of acetylene and carry out a recirculation process, the purpose of which is to sweep the acetaldehyde out of the catalyst solution as rapidly as it is formed and also to evaporate sufficient water from the catalyst solution to balance the heat of the reaction and to maintain a constant temperature of the catalyst. This method of operation is shown in German Patent 425,665 by N. Grunstein. However, when operating with the dilute acetylene, the same purpose is better served by the gases, other than acetylene, which occur in my gaseous mixture. In fact, the other gases are inert and are even more advantageous than an excess of acetylene as agents for removing acetaldehyde from the solution.

While, as pointed out, it is known that substantially pure acetylene, if compressed to a pressure above about 3 atmospheres, will decompose with explosive violence, I have found, if acetylene is in a dilute form, as I have described, it may be safely compressed to comparatively high total pressures.

Based on my findings that the amount of mercury reduced is inversely proportional to the partial pressure of acetylene, a probable mechanism for the reactions involved may be given. Operating with mercuric sulfate as the active catalyst, acetylene may combine to form an intermediate compound as shown in Equation 1:

$$C_2H_2 + 2HgSO_4 = C_2Hg_2SO_4 + H_2SO_4$$

The intermediate may further react with a molecule of water to form the second intermediate compound as shown in Equation 2:

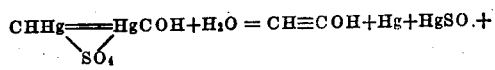

The second intermediate may further react to form vinyl alcohol and regenerate the mercury catalyst as shown in Equation 3:

Vinyl alcohol is an unstable structure, and acetaldehyde would be formed as shown in Equation 4:

$$CH_2=CHOH = CH_3CHO$$

While the above reactions show the probable course in the primary catalytic process, the speed of such reactions doubtless is a function of the partial pressure of acetylene and a side reaction may occur with the second intermediate, adding a second molecule of water as shown in reaction 3—a:

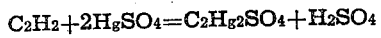

Thereupon mercury is precipitated along with the regeneration of ½ of the mercuric sulfate. The compound then formed being an unstable structure would give ketone according to reaction 3—b:

$$CH \equiv COH = CH_2=C=O$$

Ketene under the conditions of operation would react with water to form acetic acid. This mechanism for the side reaction explains the presence of acetic acid in the catalyst solution even when pure acetylene is used and no oxygen could be present for oxidation of acetaldehyde to acetic acid. The above reaction seems to be a very feasible explanation of the facts. While the first four reactions are undoubtedly influenced by the partial pressure of acetylene, the last two reactions are not so effected and hence the net result is a larger yield of acetaldehyde per unit of mercury reduced, when operating with a high partial pressure of acetylene.

Not only have I found that the yield of acetaldehyde, in the hydration of acetylene, is proportional to the partial pressure of acetylene, but I have also discovered that the yield is dependent upon the rate of gas passing through the solution. For instance, I have found that a gas flow of .7 of a cubic foot per minute per cubic foot of catalyst solution will give approximately 40% greater yield per pound of mercury reduced than if the flow is one cubic foot per minute per cubic foot of catalyst. I have further found that this effect is proportional to the actual volume of gas passing through the solution and is quite independent of the pressure. Hence, the advantage that one obtains when operating under pressure is the ability to hydrate more gas with the same volume of solution and obtain high yields based on mercury reduced; or the yield of acetaldehyde per pound of mercury can be greatly increased if the weight of gas passed through the solution is kept constant but the volume decreased by applying pressure. I have been able to take advantage of both the partial pressure and the gas rate effects by application of pressure and have been able to increase greatly the yield of acetaldehyde produced per pound of mercury.

One method of operating my invention is to subject the 12% cracked gas to a pressure absorption or liquefaction operation, as described, thereby obtaining a gas rich in acetylene and ethylene, and thence passing the gas through the hydration catalyst at an acetylene partial pressure of approximately 1 atmosphere. My invention furthermore provides for the passage of the compressed gas from which the acetylene and ethylene have been removed to an expanding engine for a recovery of power and refrigeration. Refrigeration can in turn be used for separating acetaldehyde from the hydrated gas for liquefaction. This type of operation will be described by reference to Figure III.

As already indicated in connection with the examples now under discussion, it is assumed that a suitable gas mixture containing both acetylene and olefines has been formed in the converter. It is also assumed that an oil scrubbing treatment for removing benzol and other hydrocarbons has been applied to the gas mixture. Part or all of the carbon dioxide may have been removed by steps described in connection with Figs. 1 and 2. Or, it is possible to eliminate carbon dioxide as described below. The feature which I wish to emphasize is that in my process it is important that the carbon dioxide be removed from the system in some suitable manner.

Gas, which for example, may contain about 12% acetylene and about 22% ethylene, enters through pipe 101 into compressor 102 where it is compressed to a pressure of from 10 to 20 atmospheres. The gas then passes through a water-cooled coil 103 and thence through a separator 104 for removing condensed moisture and oil from the gas. The gas then passes up through the column 105 in counter-current flow to oil which enters the top of the column through pipe 107. The oil containing absorbed acetylene and ethylene leaves the bottom of the column through pipe 108 being expanded by means of valve 109 to a low pressure of 2 to 4 atmospheres. The oil enters column 110 which is provided at the bottom with steam coil 111 which heats the oil and expels the acetylene and ethylene therefrom. The oil is then expanded to 1 atmosphere through valve 112 where gases such as carbon monoxide, carbon dioxide and nitrogen not previously removed are expelled and passes to pump 113 which returns the oil through cooler 114 into the top of the column.

Enriched acetylene and ethylene gas mixture leaves the top of column 110 through pipe 115. This gas may contain from 25% to 40% acetylene, somewhat more ethylene, and some methane and hydrogen. The gas, still at a pressure such that the acetylene is at a partial pressure of approximately 1 atmosphere, enters hydration vessel 116 through pipe 117. The vessel contains an aqueous sulfuric acid solution with dissolved and suspended mercury compounds. It is provided with a gas disperser such as the turbine type shown in the drawing, or a perforated plate or cone may be used. The temperature of this hydration vessel is maintained around 60–80° C. by the heat of the reaction. The temperature may be prevented from exceeding the limits by the evaporation of the water from the catalyst solution—the water being carried out by the inert gas comprising ethylene, methane, hydrogen and acetaldehyde vapor. Almost complete conversion of acetylene to acetaldehyde is obtained and also a high yield based on mercury reduced. The gas leaving the hydrator through pipe 117—a passes through water-cooled coil 118, where most of the water evaporated from the catalyst solution is condensed, and collected in separator 119. This condensed water which will contain considerable quantities of acetaldehyde can be transferred to a flash column which I shall describe later.

The gas containing acetaldehyde vapor passes out through pipe 120 and enters exchanger 121 and in passing down through the exchanger 121 the gases are subjected to refrigeration such that a portion of the acetaldehyde contained in the gas is condensed and collects in pot 122 from whence it may be withdrawn through pipe 123 into a storage tank 124. Refrigeration is obtained from the high pressure gas after the acetylene and ethylene have been removed. The gas leaving column 105, through pipe 125, passes through an expanding engine 126 where it is expanded adiabatically to approximately 1 atmospheric pressure, and thereby attains a very low temperature. Sufficient refrigeration is generated to condense out a considerable portion of the acetaldehyde contained in the gas from the acetylene hydrator which I have just described. The cold expanded gas, after passing through bag filter 126—a to remove frost thrown out in the engine, enters exchanger 121 through pipe 127 and passes out through pipe 128. The gas, now at a temperature of approximately atmospheric, can be used for fuel in the operation producing the initial acetylene and ethylene mixture. The gas will contain about 50% hydrogen and about 50% methane. The small amount of acetaldehyde remaining in the hydrated gas after passing through exchanger 121 enters water scrubber 129 through pipe 130. The water absorption is preferably carried out at approximately the same pressure which obtains in hydrator 116, passing out through the column in counter-current flow to water. The acetaldehyde is absorbed and the gas, practically free from acetaldehyde, passes out through pipe 131 and is expanded to approximately atmospheric pressure through valve 132. This gas will now be very rich in ethylene and is either returned to the convertor, as described under Figs. 1 and 2, or a part may be used in the enriched form as a raw material for other chemical products such as ethyl alcohol, formaldehyde, ethylene glycol.

The water solution of the acetaldehyde leaves the bottom of column 129 through the pipe 133 and after absorption in column 129 the liquid is preferably expanded to approximately atmospheric pressure through valve 134. It enters flash column 135 which is provided with a heating means such as coil 136 to expel the acetaldehyde from the liquid. In place of indirect heat, live steam may be used at the bottom of the column for accomplishing the same purpose.

The acetaldehyde vapors pass out the top of the column through pipe 137 and are condensed in condenser 138 which is refrigerated. Part of the condensate may be returned as reflux to the column through weir 139 and pipe 140. Acetaldehyde is removed to storage tank 124 through weir 141 and pipe 142. Condensers 143 and 144 are provided for preventing loss of acetaldehyde.

Another way of operating my invention where it is not desired to concentrate the ethylene is to compress the cracked gas (previously treated as described) to a pressure such that the acetylene has the partial pressure of say 1 atmosphere and hydrate the compressed gas directly. This type of operation will be described by reference to Figure 4.

As in the first method, cracked gas which for example may contain about 12% acetylene and about 22% ethylene enters through pipe 151 into compressor 152 where it is compressed to a pressure of from 5 to 15 atmospheres. The gas then passes through water-cooled coil 153 where the heat of compression is removed and then through trap 154 where condensed moisture and oil are separated. From trap 154 the gas may pass directly through the acetylene hydrator.

The gas containing acetylene at a partial pressure of approximately 1 atmosphere is passed through hydrator 166 of the type I have described above and the compressed gaseous mixture containing acetaldehyde passes out through pipe 167 and into water-cooled coil 168 where water is condensed. The water collected in trap 169 will contain considerable acetaldehyde which may be recovered therefrom by introducing into flash column 185 which I will describe below. The catalyst used in hydrator 166 and the temperature of operation are the same as described above for the other type of operation. The gas leaving trap 169 through pipe 170 into exchanger 171 and in passing down through the tubes is cooled to a sufficiently low temperature to condense a substantial proportion of the acetaldehyde contained in the gas. The gas in passing through the exchanger is preferably maintained at approximately the initial pressure. Condensed acetaldehyde collects in pot 172 and the gas passes out through pipe 175 and enters expanding engine 176 when it expands down to approximately atmospheric temperature and attains a very low temperature sufficient to throw out an additional amount of acetaldehyde which is carried out with the gas and collects in separator 176—a from which it may be withdrawn along with the acetaldehyde from pot 172 and passed through pipe 173 into storage tank 174. The cold expanded gas passes through pipe 177 and enters the shell side of heat exchanger 171 and in passing up through the exchanger gives up its refrigeration to the incoming compressed gas. Thence it passes out through pipe 178, still containing certain amounts of acetaldehyde which are removed by water scrubber 179. The gas freed from the acetaldehyde passes out through pipe 181 being expanded through valve 182. Although I have shown the scrubbing operation to be carried out under pressure, this method of operation is optional and it may also be scrubbed at ordinary atmospheric pressure. If the absorption is carried out under pressure, expansion to atmospheric pressure is carried out through valve 182. The gas leaving the top of the water scrubber contains mainly ethylene, methane, and hydrogen and may be subjected to a chemical process for converting ethylene to another product or the ethylene may be separated by liquefaction or absorption in a relatively pure form, as already described, a part being recycled to the gas formation.

The water solution of the acetaldehyde leaves the bottom of column 179 through the pipe 183 and after absorption in column 179 the liquid is preferably expanded to approximately atmospheric pressure through valve 184. It enters flash column 185 which is provided with a heating means such as coil 186 to expel the acetaldehyde from the liquid. In place of indirect heat, live steam may be used at the bottom of the column for accomplishing the same purpose.

The acetaldehyde vapors pass out the top of the column through pipe 187 and are condensed in condenser 188 which is refrigerated. Part of the condensate may be returned as reflux to the column through weir 189 and pipe 190. Acetaldehyde is removed to storage tank 184 through weir 191 and pipe 192. Condensers 193 and 194 are provided for preventing loss of acetaldehyde.

From the preceding description it will be seen that I have provided a novel method of handling commercial sources of acetylene, namely, the materials comprized only in part of acetylene, such as may be obtained from hydrocarbons. It will be observed that I have provided a method wherein such materials may be treated chemically to improve them and then physically to further alter the gas mixture. By my method of treatment and processing the usefulness of this acetylene containing material is greatly increased. That is, as I have further shown, the improved acetylene containing material either under pressure or without pressure, may, for example, be employed in chemical reactions. It will be observed that by my process it is possible to maintain the acetylene-containing materials under pressure, which as pointed out herein, may be of great value if it is desired to convert the acetylene to chemical reaction products. While in the foregoing examples I have described the use of mercury catalyst and the production of acetaldehyde, inasmuch as my invention is particularly adapted to such features, there are other products which may be formed as indicated. For example, the acetylene-containing gas might be converted to acetone or the like in place of acetaldehyde. Or, a part of the ethylene, should there be a surplus thereof, may be converted to ethyl alcohol, glycols or the like.

From the foregoing it is apparent that my invention is susceptible of some modification, hence, I do not wish to be restricted excepting insofar as is necessitated by the prior art and the spirit of the appended claims.

I claim:

1. In a process for treating gaseous mixtures having a substantial content of acetylene therein as well as olefine and impurity contents, the steps to improve the gaseous mixture which comprise subjecting the mixture to treatment for the removal of heavy impurities, then compressing the mixture to between 10 and 40 atmospheres, scrubbing the compressed mixture with a liquid absorbent that removes carbon dioxide, and then treating the resultant compressed gas mixture with dimethyl phthalate for removing the acetylene.

2. In a process for treating gaseous mixtures having a substantial content of acetylene therein as well as a content of ethylene at least as large as the acetylene content, and carbon dioxide and also other impurities from the group consisting of benzol, naphthalene, and anthracene, the steps of improving the gaseous mixture which comprises subjecting the mixture to treatment for the removal of said other impurities, compressing the mixture to between 10 and 60 atmospheres, scrubbing the mixture with an absorbent that removes carbon dioxide, and then treating the resultant compressed gas mixture with a solvent for separating acetylene, and returning at least a part of the ethylene which has been mixed with the acetylene, to the start of the process for obtaining a gaseous mixture having a content of ethylene at least as large as the acetylene content.

3. In a process for treating gaseous mixtures having a substantial content of acetylene therein as well as a content of ethylene at least as large as the acetylene content, and carbon dioxide and also other impurities from the group consisting of benzol, naphthalene, and anthracene, the steps of improving the gaseous mixture which comprises subjecting the mixture to a scrubbing with oil for the removal of said other impurities, compressing the mixture to between 10 and 60 atmospheres, scrubbing the mixture with an absorbent that removes carbon dioxide, and then treating the resultant compressed gas mixture with a solvent for separating acetylene, and returning at least a part of the ethylene which has been mixed with the acetylene, to the start of the process for obtaining a gaseous mixture having a content of ethylene at least as large as the acetylene content.

4. In a process for treating gaseous mixtures having a substantial content of acetylene therein as well as a content of ethylene at least as large as the acetylene content, and carbon dioxide and also other impurities from the group consisting of benzol, naphthalene, and anthracene, the steps of improving the gaseous mixture which comprises subjecting the mixture to treatment for the removal of said other impurities, compressing the mixture to between 10 and 60 atmospheres, scrubbing the mixture with an amino-alcohol absorbent for removing the carbon dioxide, and then treating the resultant compressed gas mixture with a solvent for separating acetylene, and returning at least a part of the ethylene which has been mixed with the acetylene, to the start of the process for obtaining a gaseous mixture having a content of ethylene at least as large as the acetylene content.

5. In a process for treating gaseous mixtures having a substantial content of acetylene therein as well as a content of ethylene at least as large as the acetylene content, and carbon dioxide and also other impurities from the group consisting of benzol, naphthalene, and anthracene, the steps of improving the gaseous mixture which comprises subjecting the mixture to treatment for the removal of said other impurities, compressing the mixture to between 10 and 60 atmospheres, scrubbing the mixture with an absorbent that removes carbon dioxide, and then treating the resultant compressed gas mixture by procedure including extraction for a solvent for acetylene, followed by the application of reduced pressure to the extract, and returning at least a part of the ethylene remaining in the gas mixture to the start of the process for obaining a gaseous mixture having a content of ethylene at least as large as the acety'ene content.

6. In a process for treating gaseous mixtures having a substantial content of acetylene therein as well as a content of ethylene at least as large as the acetylene content, and carbon dioxide and also other impurities from the group consisting of benzol, naphthalene, and anthracene, the steps of improving the gaseous mixture which comprises subjecting the mixture to treatment for the removal of said other impurities, compressing the mixture to between 10 and 60 atmospheres, scrubbing the mixture with an absorbent that removes carbon dioxide, and then treating the resultant compressed gas mixture with a solvent for separating acetylene.

RUDOLPH LEONARD HASCHE.